No. 785,055. PATENTED MAR. 14, 1905.
R. R. SPICER.
MEANS FOR PRESERVING AND EXHIBITING FLOWERS.
APPLICATION FILED NOV. 15, 1904.
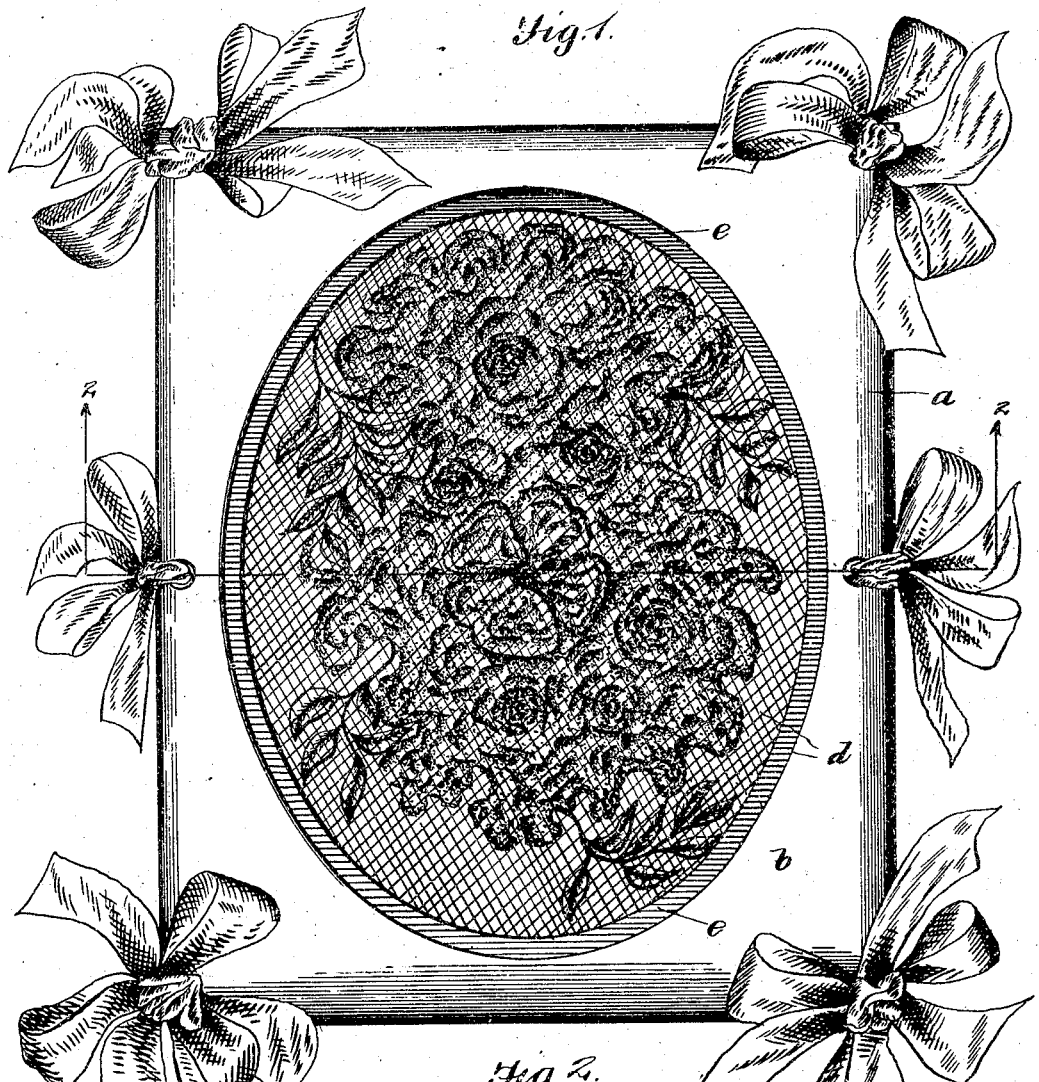
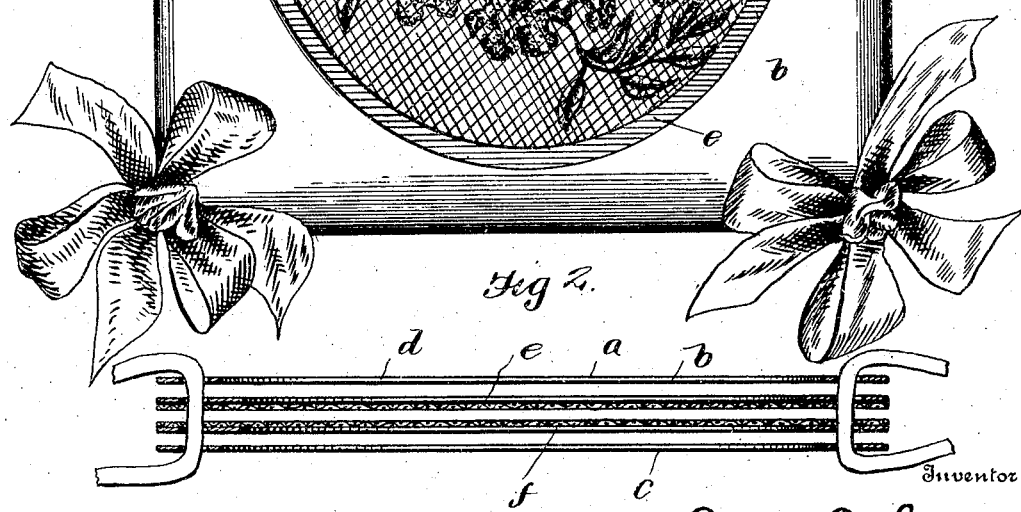
Witnesses
R. A. Boswell
N. G. Gedney
Inventor
Regina R. Spicer
By E. W. Anderson
her Attorney No. 785,055. Patented March 14, 1905.

UNITED STATES PATENT OFFICE.

REGINA ROTH SPICER, OF WASHINGTON, DISTRICT OF COLUMBIA.

MEANS FOR PRESERVING AND EXHIBITING FLOWERS.

SPECIFICATION forming part of Letters Patent No. 785,055, dated March 14, 1905.

Application filed November 15, 1904. Serial No. 233,129.

*To all whom it may concern:*

Be it known that I, REGINA ROTH SPICER, a citizen of the United States, and a resident of Washington, in the District of Columbia, have made a certain new and useful Invention in Means for Preserving and Exhibiting Flowers; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a front view of the invention. Fig. 2 is a sectional view.

The invention relates to means for preserving and exhibiting flowers and leaves, and is chiefly designed to show them in the form of clusters, whereby the esthetic features of a combination may be shown to advantage.

In the accompanying drawings, illustrating the invention in a form which has been used to advantage, the letter $a$ designates a sectional frame of about eight by ten inches in its dimensions. This frame consists of two portions, a front part $b$ and a back part $c$, and each part of the frame is provided with a sight-opening $d$, which may be rectangular, or it may be elliptical, as shown. Between the front and back sections of the frames is located the holder-mat or inner frame, which consists of a front portion $e$ and the back portion $f$. These portions are of similar size and shape, as they are designed to be opposed to each other, and they are preferably made of about the size and shape of the outer frame $a$, their sight-openings being, however, usually a little smaller in order that the marginal portion of such sight-opening shall project more or less within the margin of the sight-opening of the outer frame. This inner frame or mat-holder is usually gilded or made of paper of different color from that of the exterior frame.

To the inside surface of each part of the mat-holder is secured by its marginal portion a sheet of silk netting of open mesh and fine thread, such netting closing the sight-opening sufficiently for the purposes hereinafter referred to and yet affording so little obstruction to light and air as to be practically inconsiderable. It will therefore appear that the silk net or open-work lace forms a part of the mat-frame. The frame-sections are attached together so as to be relatively secure. In the drawings they are shown as perforated and secured together by tying the ends of ribbons passed through the perforations. In this way the frame-sections are detachable.

Such flowers and leaves as are desired to be preserved are dried and somewhat flattened out to show their form without, however, much pressure and are attached by their back portions to the rear netting of the holder-frame by means of an adhesive substance or by sewing them thereto. A flower in being attached should have its calyx flattened and secured to the web. A leaf should be secured by its stem portion. The front netting extends over the fronts of the flowers and leaves and holds them in position, at the same time guarding them against casual injury and protecting them from the action of the wind, which might otherwise break off delicate petals and other parts. Flowers and leaves can thus be held between the soft back and front webs of the holder and will be preserved without being liable to be broken or deformed, and as the air can freely penetrate through the meshes back and front its varying content of moisture will tend to freshen up the flowers and improve their appearance from time to time. Transparent flowers, such as hollyhocks and geraniums, are especially available in this connection when the device is to be hung in a window where the light and air have free access. The article in this way forms a transparency in which the forms and colors of the flowers and leaves are presented in a permanent and attractive manner.

It is evident that the framing of the webs may be varied in many ways in so far as shape and size are concerned, such variations being governed by the character of the cluster of flowers and the principles of good taste and esthetic design.

Having described the invention, what I claim, and desire to secure by Letters Patent, is—

1. A frame for preserving flowers having a back section to which the flowers are attached, and a front section having the sight-opening and soft netting attached to the front section and closing such opening, substantially as specified.

2. A frame for preserving flowers, having back and front sections, opposed to each other, each section having a sight-opening and a web of soft netting attached to the section and closing such sight-opening, substantially as specified.

3. A frame for preserving flowers having a back section provided with a sight-opening and a web of soft netting attached to said section and closing such sight-opening, and a front section having a similar sight-opening and a web of soft netting similarly attached closing the latter sight-opening, said sections being opposed to each other, and detachably secured together, substantially as specified.

4. The combination with one or more dried flowers or leaves, of a sectional back holder having a sight-opening, a web of netting closing such sight-opening and carrying the flowers or leaves which are connected thereto, a sectional front holder opposed to such back holder, and having a sight-opening, and a web of netting closing the latter sight-opening and forming a transparent protection-guard extending over the fronts of the flowers and leaves, substantially as specified.

In testimony whereof I affix my signature in presence of two witnesses.

REGINA ROTH SPICER.

Witnesses:
MATTHEW TRIMBLE,
CHARLES W. BLAND.